May 2, 1944.                    W. DZUS                    2,348,116
DEVICE FOR POSITIONING AND ALIGNING APERTURES
Filed March 3, 1942
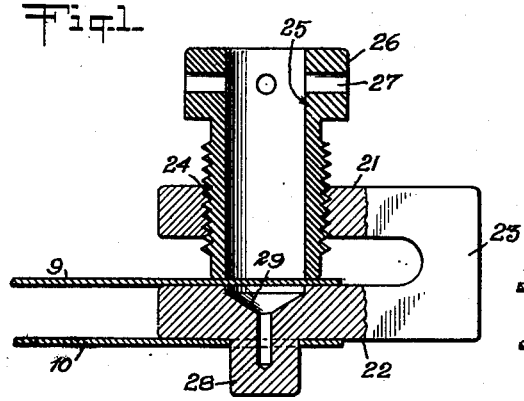
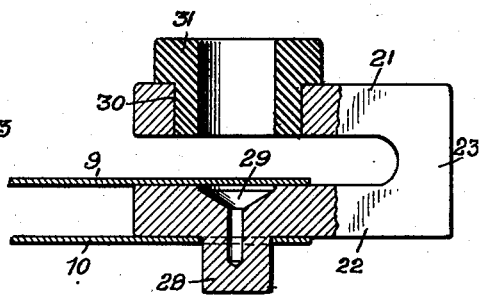
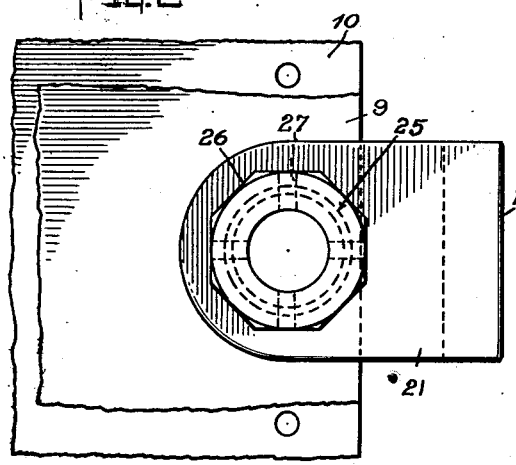
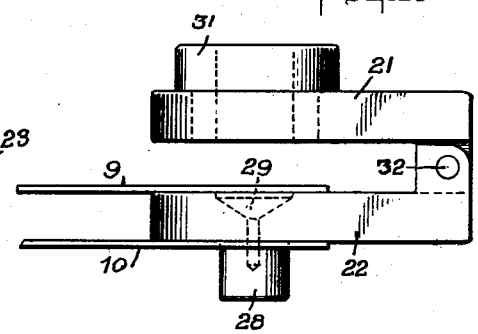
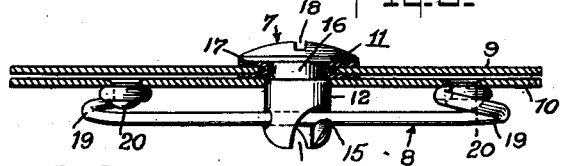
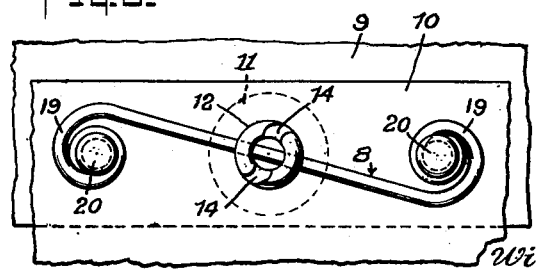
INVENTOR
William Dzus
BY
ATTORNEYS
WITNESSES Patented May 2, 1944

2,348,116

UNITED STATES PATENT OFFICE 2,348,116

DEVICE FOR POSITIONING AND ALIGNING APERTURES

William Dzus, West Islip, N. Y.

Application March 3, 1942, Serial No. 433,130

2 Claims. (Cl. 77—62)

This invention relates to an improved device for positioning and aligning apertures. This application is a continuation in part of my co-pending application, Serial No. 398,138, filed on June 14, 1941.

It is an object of the invention to provide an improved tool or jig which may be used for positioning, spotting, or forming an aperture in one article or part, in alignment with an aperture in another article or part.

There are many instances where it is desirable to form, spot, or position an aperture in one article in alignment with an aperture in another article. Thus, in the installation of a fastening device of the type shown in my Patent No. 1,955,740, granted on April 24, 1934, a pair of co-operating fastening elements are secured to two separate parts or members, and it is necessary for one of the fastening elements to pass through aligned apertures formed in the two parts or articles. My improved tool or jig may be used for positioning, spotting, or forming apertures of this type in alignment with each other.

Among other objects of my invention is the provision of an improved device of the above character which is of relatively simple and inexpensive construction, which can be used by comparatively unskilled persons to properly align apertures, and which is so formed that it cannot readily get out of order.

Other objects will be apparent from the following detailed description of the drawing, in which:

Fig. 1 is an elevational view partially in section of a device embodying my invention;

Fig. 2 is a top plan view of the device;

Fig. 3 is a view similar to Fig. 1 of a modified form of my invention;

Fig. 4 is a side elevational view of a further modified form of my invention;

Fig. 5 is a side elevational view partially in section of a fastening device applied to two articles or parts having aligned apertures formed therein; and Fig. 6 is a bottom plan view of the fastening device.

My improved tool or jig may be used for positioning, spotting, or forming apertures in alignment with each other for many different purposes. Thus, it may be used in connection with the installation of fastening devices of the type shown in my Patent No. 1,955,740, and in the accompanying drawing, I have illustrated my invention as being used for this purpose.

While the fastening device per se forms no part of my present invention, it will facilitate the understanding of one use to which the tool or jig may be placed, if the fastening device is briefly described.

The fastening device is shown in Figs. 5 and 6 and consists of a stud element 7 and a spring element 8, which are attached to a pair of parts or articles taking the form of the plates 9 and 10. The stud element 1 comprises an enlarged head 11 having a tubular shank 12 provided with a pair of cam-like spiral slots 14 extending upwardly from the lower end thereof and formed with shoulders 15 to resist retrograde rotation of the stud element and release of the spring element when the fastening device is in locked position.

The stud element is applied to the plate 9 by projecting the shank thereof through an aperture formed in the plate. Immediately beneath the head the stud is formed with a groove 16 which receives the projecting edge of the grommet 17 secured around the aperture in the plate 9 and which serves to attach the stud element to the plate while at the same time permitting its rotation. Suitable means, such as the kerf 18, may be provided in the head of the stud element so as to facilitate the rotation or operation thereof.

The spring 8 is made of resilient strong material, such as wire, and at its opposite ends is formed into coils 19 which are secured to the plate 10 by means of the rivets 20. The plate 10 is formed with an aperture adjacent the central portion of the spring 8 and in alignment with the aperture in the plate 9.

In assembling the fastening device the shank 12 of the fastening element is projected through the aperture in the plate 10 and the central portion of the spring element will rest in the entrance branches of the slots 14. Upon rotation of the stud element in a clockwise direction, the spring will be drawn upwardly by the spiral cam-like slots until it is locked behind the shoulders 15, as shown in Figs. 5 and 6, of the drawing. To release the interengagement of the parts, the stud is rotated in a counter-clockwise direction.

It will be seen that in the installation of a fastening device of this type it is essential that the apertures in the plates 9 and 10 be formed in alignment with each other and my improved tool or jig may be used for this purpose.

Referring now to the form of the invention shown in Figs. 1 and 2, it will be seen that the tool comprises a pair of spaced parallel plates 21 and 22, connected at one end by an integral wall 23. The plate 21 is formed with a threaded aperture 24 which accommodates an externally threaded tubular guide 25 which, it will be appreciated, may be rotated to shift it upwardly or downwardly, towards or away from the plate 22 so as to enable the tool to accommodate plates, articles or parts of varying thicknesses. The tubular guide may be provided with an octagonal or polygonal shaped head 26 so that a wrench may be applied thereto, and apertures 27 may be extended transversely through the head through which a nail or other tool may be inserted to aid in the rotation thereof.

Plate 22 is formed with a stud or lug 28 depending downwardly from the lower surface thereof in alignment with the aperture 24 and with the tubular guide 25. On the upper surface of the plate 22, also in alignment with the aperture 24 and tubular guide, I preferably provide a recess 29, in the manner shown.

The device may be used for positioning, spotting, or forming an aperture in the plate 9 in alignment with the aperture formed in the plate 10. In this connection the stud 28 is inserted in the aperture in the plate 10, and the plate 9 is inserted between the plates 21 and 22 and the tubular guide 25 is shifted downwardly so as to contact the plate 9 or so as to be positioned a short distance above the surface thereof. The tubular guide may then be used as a guide for a drill or punch which is inserted therethrough and may be used to either form or spot an aperture in the plate 9. Due to the fact that the tubular guide is threaded in the aperture 24, it will be seen that it may be shifted towards or away from the plate 22 so as to accommodate articles, parts or plates of varying thicknesses.

In Fig. 3 I have shown a modified form of device also provided with spaced parallel plates 21 and 22 connected at one end by an integral wall 23. The plate 21 is formed with an unthreaded aperture 30 in which is fitted the upstanding collar 31. The plate 22 is constructed in the same manner as in the first form of my invention, having a depending lug or stud 28 in alignment with the aperture 30 and collar 31 and also having a recess 29 formed in its upper surface.

The device shown in Fig. 3 may be used in the same manner as the device shown in Figs. 1 and 2 with the exception that the collar 31 cannot be adjusted towards or away from the plate 22. Thus, it will be seen that the stud 28 is inserted in the aperture in plate 10 and plate 9 is inserted between the plates 21 and 22. A drill or punch is then inserted downwardly through the collar 31 and the aperture may be either spotted or formed in the plate 9. Where a series of fastening devices are to be applied to a pair of plates 9 and 10, my improved aligning device may be conveniently used to properly align the aperture in plate 9 with the aperture in plate 10, in the manner just described.

In the further modified form of my device, shown in Fig. 4, the plates 21 and 22 are hingedly connected together, as indicated at 32, rather than being fixedly joined together, as in the first two forms of my invention. The hinge should be of the character shown so that when the plates are in operative position they are arranged in parallel spaced relationship. However, they may be shifted outwardly away from each other. In all other respects, the device shown in Fig. 4 is similar to the device shown in Fig. 3. In this connection it should be appreciated that in the form of device shown in Fig. 4, I may employ a tubular guide 25 similar to that shown in the first two figures of the drawing, instead of the collar 31.

It is particularly convenient to use the form of aligning device shown in Fig. 4 when the plate 9 is pivoted to the plate 10. Under these circumstances the stud 28 may be inserted in the aperture in plate 10 and the plate 21 may then be pivoted upwardly so as to permit the plate 9 to be pivoted downwardly into contact with the upper surface of plate 22. The plate 21 is then shifted back into operative position and the aperture is spotted or formed in the plate 9, in the manner described above.

After the apertures have been spotted or formed in the plate 9 in alignment with the apertures in plate 10, the fastening devices shown in Figs. 5 and 6 may be attached to the plates.

It should be understood that while I have described my invention as being used to position, spot or form apertures in alignment with each other in connection with the installation of fastening devices of the type shown in my Patent No. 1,955,740, that my invention is not limited to this purpose and that it may be used wherever it is desired to form apertures in a part, plate or article in alignment with an aperture formed in another part, plate or article.

It should also be understood that, while I have shown three specific embodiments of my invention, modifications may be made in the illustrated and described embodiments of my invention without departing from the invention as set forth in the accompanying claims.

I claim:

1. A device for aligning an aperture to be formed in a first article with an aperture in a second article comprising a frame including a pair of spaced members adapted to receive therebetween the first article in which the aperture is to be aligned, one of said members being formed with a guide aperture extending therethrough, and the other of said members being formed with a stud in alignment with the said guide aperture in the other member and projecting away from the other member, the said stud being adapted to be engaged in the aperture in the second article.

2. A device as set forth in claim 1 in which the two members are connected together adjacent one edge by means of a hinged connection.

WILLIAM DZUS.